Sept. 4, 1956        E. L. TRIMAN        2,762,035

ETCHING DEPTH LIMIT MONITOR

Filed Sept. 2, 1954                            3 Sheets-Sheet 1

*INVENTOR.*
EUGENE L. TRIMAN
BY William R. Lane
ATTORNEY

*INVENTOR.*
EUGENE L. TRIMAN
BY
William R. Lane
ATTORNEY

Sept. 4, 1956　　　　　E. L. TRIMAN　　　　　2,762,035
ETCHING DEPTH LIMIT MONITOR
Filed Sept. 2, 1954　　　　　　　　　　　　　3 Sheets-Sheet 3

INVENTOR.
EUGENE L. TRIMAN
BY William R. Lam
ATTORNEY

United States Patent Office 2,762,035
Patented Sept. 4, 1956

2,762,035

ETCHING DEPTH LIMIT MONITOR

Eugene L. Triman, Whittier, Calif., assignor to North American Aviation, Inc.

Application September 2, 1954, Serial No. 453,755

13 Claims. (Cl. 340—267)

The present invention pertains to apparatus for monitoring an etching process. More particularly, the invention is directed to a depth monitor for sensing and signaling that a desired depth of chemical etching has been reached. This apparatus is particularly applicable to monitor the chemical milling process described in U. S. patent application Serial No. 389,289 filed October 30, 1953.

Heretofore, the etching of various metals has been controlled in one of two ways: First, on a straight time basis; and second, on periodically removing the metal to physically measure the remaining thickness. It is obvious that the first method does not take into consideration changes in etching rate which accompany a relatively long term etching process. The second method is, of course, wasteful of time and accuracy due to the periodic removal of the work from the bath. When a multiplicity of pieces are in a bath, this method easily leads to confusion especially since the bath characteristics may vary without operator cognizance. These problems are particularly acute when a high degree of tolerance is required in the etched member.

The present invention provides means for monitoring the depth of chemical milling or etchings by the basic provision of a fuse link, either separate from or integral with the workpiece, which is adapted to be chemically attacked at the same rate as the workpiece. The dimensions of said fuse link are chosen so at least one minimum dimension corresponds to or is proportional to the desired depth of etch in the workpiece. This dimension is such that when the desired etching depth is reached an effective discontinuity occurs in the fuse link which is sensed, triggered and signaled to the operator. Specific means is provided by this invention to carry out each of these operations. As will be seen below, the means provided include electrical, mechanical and pneumatic means as well as combinations thereof. The apparatus, hereinafter described and claimed, is not limited to use in the aforesaid chemical milling process but has utility in any area where it is desired to monitor the depth or amount of etching which has been accomplished.

An object of this invention is to provide apparatus for monitoring etching depth.

A further object of this invention is to provide various means for monitoring the amount which a workpiece has been chemically milled.

A still further object of this invention is to provide a fuse link means adapted to be subjected to the same etching conditions as the workpiece.

An additional object of this invention is to provide a multiple channel depth limit monitor.

A further object of this invention is to provide a depth limit monitor comprising a fuse link integral with the workpiece.

A still further object of this invention is to provide a depth limit monitor comprising a separate fuse link adapted to be subjected to the same etching rate as the workpiece.

An additional object of this invention is to provide a depth limit monitor comprising a fuse link and having electrical means for sensing a discontinuity in said link.

A further object of this invention is to provide a depth limit monitor comprising a fuse link having mechanical means for sening a discontunity in said fuse link.

A still further object of this invention is to provide a depth limit monitor comprising a fuse link and having pneumatic means for sensing the attainment of a desired depth of etch.

The above objects, as well as other objects of this invention, will be apparent from the following description and drawings, in which Fig. 1 is a general schematic showing one form of the invention in operation;

Figure 1:
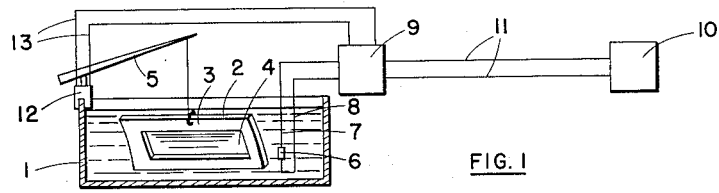

Fig. 1 schematically illustrates the use of a separate fuse link to monitor the desired etching depth. Etching of various workpieces is normally carried out in a tank 1 containing an etchant chemical. The particular etchant chemical used depends on the metal being etched and on the desired etching rate. In the etching of aluminum, for example, caustic soda is normally used. The workpiece 2, as shown, comprises a curved sheet having an etch proof film 3 on the edges thereof. The action of the etchant etches away the metal in the area 4, resulting in a chemically milled sheet having a central area of less thickness than the original material and the remaining non-etched portions. Handling equipment 5 is normally present to move the sheet 2 in and out of the tank 1 as desired. Due to the consumption of etchant material, change in bath conductivity and temperature and to the formation of various by-products in the etching process, the etching rate is not constant throughout the etching cycle. Thus, a control on a straight-time basis is inapplicable to most etching processes. The difficulties inherent in removing the sheet 2, or many sheets in the same bath, for actual physical measurement of the central thickness is apparent.

Figure 8:
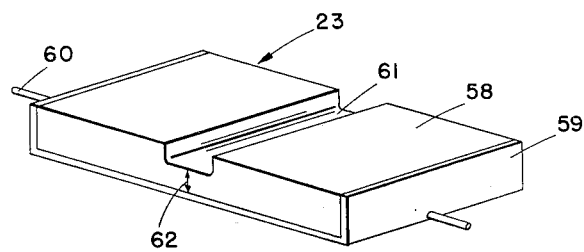
Fig. 8 illustrates a typical fuse link in detail.

As illustrated in Fig. 1, a fuse link 6 is placed within the tank 1 and is exposed to the same etching conditions as the workpiece 2. The fuse link 6, illustrated in detail in Fig. 8, is made of the same material as the workpiece and is etched at the same rate as the workpiece. The fuse link 6 has a least one minimum dimension which is proportional to the desired depth of etch. In the normal fuse link, this minimum dimension is such that an effective electrical or mechanical discontinuity occurs in the fuse link when the predetermined depth of etch has been attained. In the case of a separate fuse link, the minimum dimension will ordinarily be equal to the desired depth of etch. In sensing an electrical discontinuity, the hereinafter described shunt effect of the fuse link ends at a critical value of approximately one micro inch or less dependent on the actual fuse dimensions. This value is thus the theoretical error. However, due to the relatively greater error inherent from the etching attack, tolerances in the herein described monitoring means will ordinarily be of the order of plus or minus one or two mils. During the simultaneous etching attack on the workpiece 2 and the fuse link 6, an electrical current is passed through the fuse link 6 through leads 7 and 8. A sensing unit 9, preferably in an enclosed unit in close proximity to the tank 1, is capable of sensing a discontinuity in the fuse link 6. When this discontinuity occurs and is sensed, a sensing signal may be sent to a triggering and signaling means 10 by leads 11, or to another triggering means 12 and to the handling equipment 5 by leads 13. Thus, the operator of the etching bath will be appraised of a discontinuity and the attainment of the predetermined etching depth by a visual or audio signal from the device 10 and/or the workpiece may be automatically removed from the bath.

It has been stated that the instant monitor is particularly adapted for monitoring the selective etching of various workpieces. All types of sheets, forgings, castings and stampings, formed or unformed, are examples of the various types of workpieces which may be monitored by the described apparatus. The workpieces and fuse links should be of the same composition for the best accuracy. Such metals as titanium, aluminum and steel have been successfully etched and monitored in alkaline and acid etchant solutions.

Figure 2:
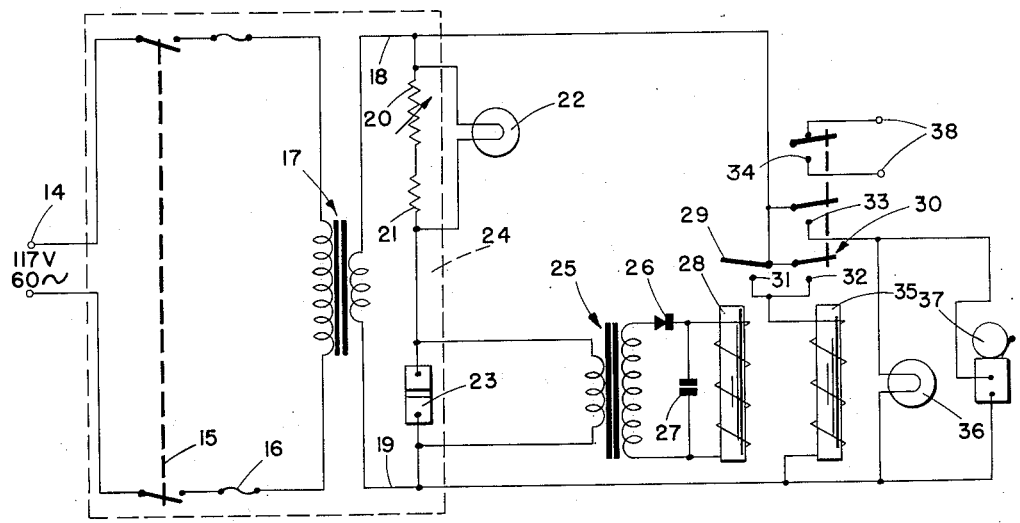
Fig. 2 shows an electrical monitoring means.

Fig. 2 shows in detail a typical electrical means for sensing, triggering, and signaling the attainment of the desired depth of etch. An alternating current source 14 is provided as a supply voltage to the system. An alternating current source is chosen for convenience in obtaining low voltages which are normally desired for reasons of safety and due to the normal bath conductivities. A direct current source, however, may also be employed in this invention. A circuit interrupting switch 15 and fuse 16 is normally incorporated in the circuit leading to a step-down transformer 17. Connected to the low voltage side of the transformer 17 through lead 18 are current limiting resistances 20 and 21, the former being variable to provide a sensitivity control and to adjust the triggering point of the system. A light 22 is placed across these resistances to indicate activation of the circuit. The fuse link 23 is connected in series with these resistances and the other terminal of the low voltage side of the step-down transformer 17 through lead 19. During the etching of the workpiece and the simultaneous and equal etching of the fuse link 23, the fuse link 23 acts as a shunt for carrying the current through the low voltage side of the step-down transformer 17. This shunt prevents application of any substantial voltage to a sensitive relay placed across the fuse link. When the fuse link and the workpiece are immersed simultaneously in the etching bath, the etching action eventually causes an effective discontinuity in the fuse link. The discontinuity can take the form of a minimum dimension (1 microinch for example) in which the above-mentioned shunt effect is gone or may be an actual physical break of the fuse link. Changes in etching rate due to etchant concentration, temperature, and conductivity produce equal attack on both the fuse link and the workpiece. At the moment the desired depth of etch is reached, a discontinuity occurs in the fuse link, which removes the shunt effect and permits energization of the relay hereinafter described. Numeral 24 denotes the equipment which preferably should be in proximity to the etching tank. It is highly desirous that the current supply leads to the fuse be kept at a minimum to keep the resistance of this part of the circuit at a minimum. The remainder of the apparatus to the right of the dotted area 24 may be situated remote from the etching tank.

The voltage rise occurring at the moment the discontinuity occurs in fuse link 23 is passed through a step-up transformer 25, is rectified by rectifier 26, is smoothed by a condenser 27, and actuates an electromagnetic relay 28. Energization of the sensing relay 28 pulls down switch blade 29, closing the circuit between the step-down transformer 17 and a power relay 35. Actuation of the electro-magnetic triggering device 35 pulls down the ganged switch 30, which in turn closes contacts 32, 33 and 34. The circuit of switch 30 is of the holding type which will continue the energization of the electro-magnetic means 35 until the feed circuit switch 15 is open. Once the triggering solenoid 35 is actuated, the remainder of the triggering means and the subsequently described signaling means is independent of the contact between the switch blade 29, the contact point 31, and the sensing relay 28. Connected to contact point 33 are light signal means 36 and audio buzzer signal means 37. Each of these means used individually or collectively will inform the operator that a discontinuity has occurred in the fuse link 23 and that the desired depth of etch has thus been obtained.

In the alternative, the ganged switch blade 30 may complete a circuit through contact 34 and an auxiliary power source (not shown) on contacts 38 which will operate the handling equipment as illustrated at 5 and 12 in Fig 1. This also acts as a signaling means.

Figure 3:
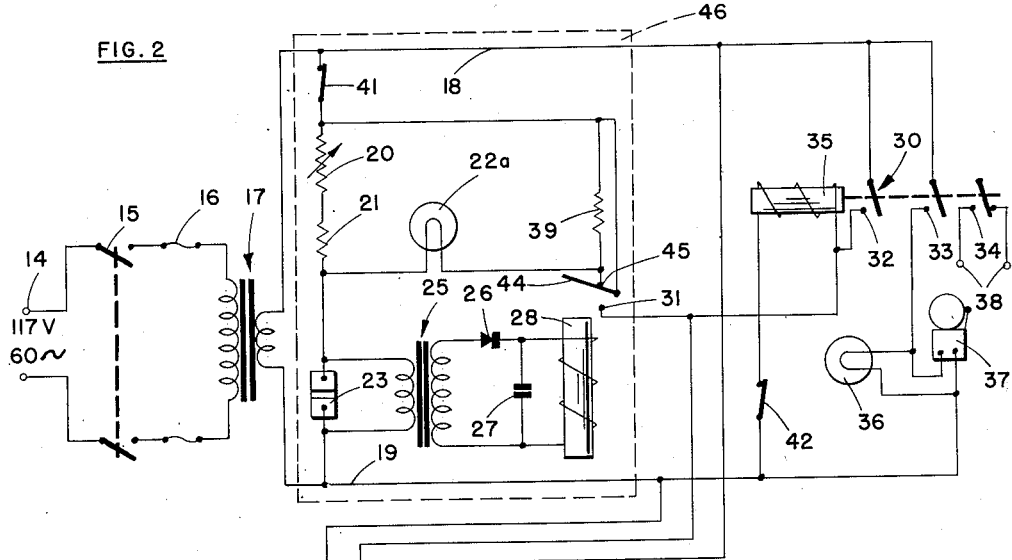
Fig. 3 shows a modified electrical monitoring means.

Fig. 3 illustrates a multichannel depth monitor having a sensing, triggering and signaling means basically similar to that of Fig. 2, but having a modified "on" indicator circuit and visual signaling means. The lamp 22 in Fig. 2 indicates that the circuit is "on" and that the fuse is continuous. During the etching operation, the lamp is brilliantly lighted, but when the fuse is severed, the lamp goes out. The lamp is thus dependent upon fuse condition. In Fig. 3, however, where multiple channels are provided for monitoring more than one workpiece at the same time, a modification of the circuit is provided to prevent erroneous indications due to premature failing of the lamp itself. By providing a resistor 39, as illustrated in Fig. 3, the lamp 22a will give a continuous brilliance during etching operation, and will indicate that the fuse is continuous and that the circuit is actuated. In addition, when a discontinuity does occur in the fuse link 23, the switch blade 44 will contact the contact 31 and break contact at 45. This break in contact at 45 puts the resistor 39 in series with the lamp 22 and reduces the brilliance of that lamp by a fixed amount. Thus, it can be seen that a dim light will indicate that a discontinuity has occurred in a particular fuse link. A light that is entirely out will indicate either a dead circuit or a light failure. In the multichannel monitor illustrated in Fig. 3, a switch means 41 is provided in each of the parallel individual channels 46 to disconnect any one channel. The remainder of the sensing circuit of Fig. 3 corresponds to that of Fig. 2. One triggering and signaling circuit can be used to monitor the multichannel sensing units 46. The actual triggering and signaling means must be read in conjunction with the status of the light 22a. Thus, when a lamp 36 or buzzer 37 (deemed a second signaling means) is actuated through the means 35 and a switch means 30, reference must be had to the status of each of the bulbs 22a (deemed a first signaling means) in each of the channels 46. Thus, in operation, for example, the buzzer 37 is heard, indicating a discontinuity in some one of the shunts, and a glance is made at the various bulbs 22a to see which particular fuse link has suffered a discontinuity indicating the attainment of the desired etching depth in the particular sample being monitored by that channel. The switch 41 associated with that fuse link is then turned off or a new fuse inserted along with a new workpiece. In order to de-actuate the triggering means and second signaling means to make such means responsive to another link discontinuity, a toggle switch 42 is provided.

Figure 3A:
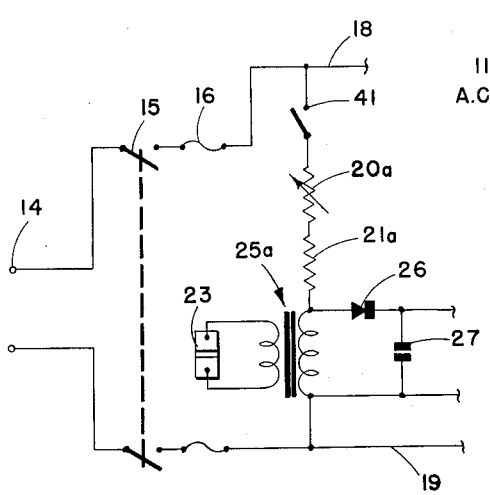
Fig. 3a shows a variation of the monitoring means of Fig. 3.

In Fig. 3a, the voltage supply may be supplied to the secondary of a transformer 25a, and the shunting action of the fuse will then be made effective through the transformer. This effectiveness will be the normal result of the basic property of a transformer which is to reflect the impedance of one winding into the impedance of the other winding. This provides complete isolation for each individual fuse and dispenses with the transformer 17. In this modification the resistors 20a and 21a must be adjusted in value due to the higher voltages involved. The remainder of the partial circuit illustrated in Fig. 3a may correspond to that illustrated in Fig. 3.

Figure 4:
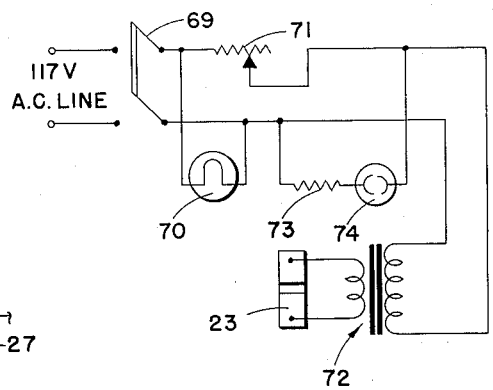
Fig. 4 shows a still further modified electrical sensing means.

A further modification of an electrical sensing and indicating means is illustrated in Fig. 4. In Fig. 4 line voltage is supplied at switch 69 with an "on" indicating lamp at 70. A resistor 71 to provide sensitivity control over the circuit and a step-down transformer 72 leading to the fuse link 23 are provided. A fixed resistance 73 and a glow lamp 74 are placed across the primary of the step-down transformer 72. In operation, the circuit will be closed at 69, light 70 will be "on" and a current flow will take place through the glow lamp 74 which will not "glow" due to the shunting effect of the transformer 72 on the supply voltage. When a discontinuity occurs in fuse 23, the resistance of that fuse element will be at a maximum and the impedance of the primary side of the transformer will be sufficiently high in comparison to the resistor 71 that the potential difference through the lamp 74 will ionize the gas therein, causing the lamp to glow. Glowing of the lamp 74 thus indicates a discontinuity in the fuse and the attainment of the desired etching depth. The glow lamp 74 may be any type of a gas-filled lamp such as a neon lamp or a thyratron. Furthermore, an audio means may be connected to the disclosed glow lamp circuit to audibly indicate discharge of such lamp.

Further modifications of the above circuits may be made. For example, a voltmeter may be placed in parallel with the sensing relay 28 of the device illustrated in Figs. 2 and 3, to indicate relative fuse thickness. This voltmeter may be used as a pre-warning device to indicate when the fuse link is approaching a discontinuity. Furthermore, a contact meter relay may be used in place of the sensing relay 28 to provide visible operation of the relay. The rectifier illustrated in Figs. 2 and 3 may be of the metallic type or may be of the vacuum tube type. Furthermore, the two relays illustrated in Figs. 2 and 3 may be combined into one single relay especially where the chance of the two broken ends of the fuse link contacting would not be a problem. In addition, a solenoid type valve may be substituted for the illustrated power relay 35. The circuits illustrated in Figs. 2 and 3 are rugged in operation and inherently give an amplification factor without the use of vacuum tubes. The amplification of the circuit comes from the step-up transformer and the charging of the condenser 27 to peak value. Vacuum tube operated relays of the A.-C. or D.-C. type could also be employed to sense and trigger the discontinuity in the fuse link.

Figure 5:
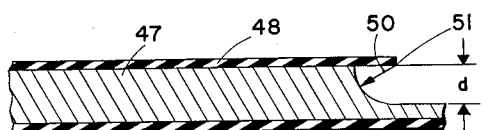
Fig. 5 illustrates the etching attack on a masked sheet.
Figure 6:
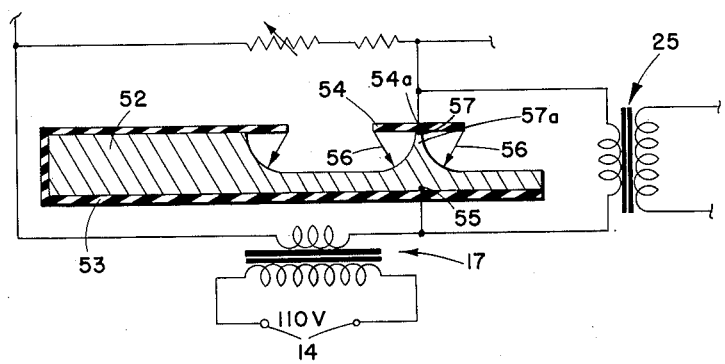
Fig. 6 shows an electrical sensing means with an integral fuse link.

Fig. 5 illustrates the normal action of the etchant attacking a metal surface. Shown is a metal sheet 47 having an etch proof film 49 on the back thereof and a partial etch proof film 48 on the surface to be etched. When the sheet 47 is to be etched a predetermined depth $d$ as shown, the etching attack will also undercut the exposed edge of the etch proof film 48 forming a fillet. The fillet will have a radius 50, from the point 51, equal to the desired depth of etch $d$. This principle is used as a basis for the integrally formed fuse link shown in Fig. 6. This fuse link is integrally formed with the workpiece 52, and entails the use of an etch proof circle or the like 54, which has a diameter equal to twice the desired depth of etch. In the selective etching of the workpiece 52, the workpiece 52 is coated with an etch proof layer 53, leaving an area free of the etch proof layer. The etch proof circle or disc 54 is attached on an unprotected part of the sheet 52, and the entire sheet exposed to the action of an etchant. The etching action will, in addition to eating away the directly exposed metal, undercut the disc 54 an amount equal to the actual depth of etch in an unprotected area. Fig. 6 shows the fillets having radii 56 formed by the undercutting. Electrical connections are made through the etch proof film 53 and the disc 54 at 55 and 57, respectively. When the desired depth of etch $d$ has been attained, the etching action will be such that an effective discontinuity occurs in the integral fuse link 57a. The area at which a discontinuity occurs is greatly magnified in Fig. 6 to illustrate the etching action. As explained above, this discontinuity occurs when the fuse link loses its shunt effect. The partial circuit diagram shown in Fig. 6 is similar to that illustrated in Fig. 2 and includes the A.-C. voltage source 14, a step-down transformer 17, sensitivity controls 20, 21 and the step-up transformer 25.

The circuit is such that during the etching procedure the fuse link, actually a portion of the workpiece, acts as a shunt between the contact points 57 and 55. When an effective discontinuity occurs in the fuse link as at 57a, the shunt effect is lost and current flow through transformer 25 increases to a predetermined value. This in turn actuates sensing and power relays similar to those heretofore described.

Figure 7:
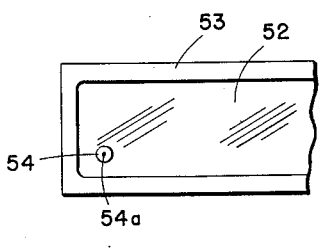
Fig. 7 shows a top view of the sheet of Fig. 6.

Fig. 7 is a top view of the integral fuse link illustrated in Fig. 6. The workpiece 52 is shown to be masked at 53 and the etch proof disc 54 with its lead-in 54a in place to monitor the attainment of an etching depth equal to one-half the diameter of the disc 54.

Fig. 8 illustrates in detail a preferred form of a separate fuse link. The fuse link 23 preferably comprises a piece of metal of the same material as the workpiece. The illustrated fuse link is ordinarily used when only one side of a workpiece is to be etched. An etch proof film 59 is placed on the underside of the fuse link and at the ends thereof. Leads 60 are connected to the ends of the fuse link 23 through the film 59. A channel 61 is provided in the surface 58 of the fuse link forming an effective critical dimension 62 which is equal to the desired depth of etch. In operation, the etchant will evenly attack both the workpiece and the separate fuse link at the same rate. All parts of the fuse link exposed to the etchant will be attacked at the same rate, the etchant eating through the surface 58 and eating through the vertical dimension 62. When the etching attack has progressed sufficiently to cause an effective discontinuity at the zone 62, the shunt effect of the fuse 23 is lost. The remainder of the monitor means senses this discontinuity and signals its occurrence to the operator.

It can be seen that when the sheet is to be etched on both sides that the etch proof film 59 may or may not be applied to the underside of the specimen. Regardless of this, the critical zone 62 must be adjusted to correspond to the total depth of etch desired. Care must be taken to protect the connection of the lead 60 to the fuse link 23 from the etching action. This normally can be done by providing that the etch proof film 59 extends to the ends of the fuse link, as illustrated in Fig. 8. In the etching of clad sheet, the channel area ordinarily will be reversed so that the critical dimension area 62 includes all of the cladding material. Such a fuse link will thus present an uninterrupted top surface with the channel portion on the opposite surface adjacent the film 59. When the etching depth is mechanical sensed as hereinafter explained, the fuse link may be devoid of protective film and the weakening channel portion.

Figure 9:
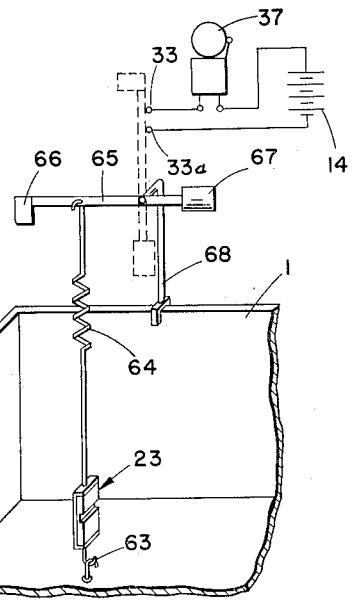
Fig. 9 illustrates a typical mechanical means to monitor etching depth.

Fig. 9 illustrates a mechanical means for sensing the discontinuity in the fuse link and a mechanical means of triggering and signaling the attainment of such a discontinuity. The fuse link 23 is placed in the etching tank 1 between a holding means 63 and a spring means 64. A lever member 65 is connected to spring 64 and is pivotally mounted on a bracket 68. Typically, a counterweight 67 and flag-type signal 66 are incorporated on lever 65. The fuse link 23 is exposed to the same etching action as the workpieces (not shown) which will be in tank 1. A critical dimension of the fuse link 23 is chosen to correspond to the desired depth of etch on said workpieces. When such desired depth of etch has been attained, the spring tension on the link 23 will be greater than the strength of the weakened zone in the fuse link. The spring tension chosen is such that the device is responsive to a predetermined decrease in the tensile strength of said fuse link. The fuse link will then break, causing the flag 66 to be elevated into the dotted position. This is an effective visual signal to the operator indicating that the desired depth of etch has been attained. The lever member 65 may further bridge contacts 33 and 33a to actuate a simple bell circuit including a power source 14 and bell 37, similar to that illustrated in Figs. 2 and 3. Other mechanical equivalents of the illustrated device are apparent. For example, in Fig. 11 the fuse link 23 may be held horizontally by means 63 and 64, and a weight comprising a flag rod 65a or the like placed thereon. When an effective portion of the fuse link is eaten through, the weight will break the fuse link, causing the weight, guided by tube 65b, to fall towards the bottom of the tank. Effective audio or visual signal means may be triggered by the falling of the above-mentioned weight.

Figures 10, 11:
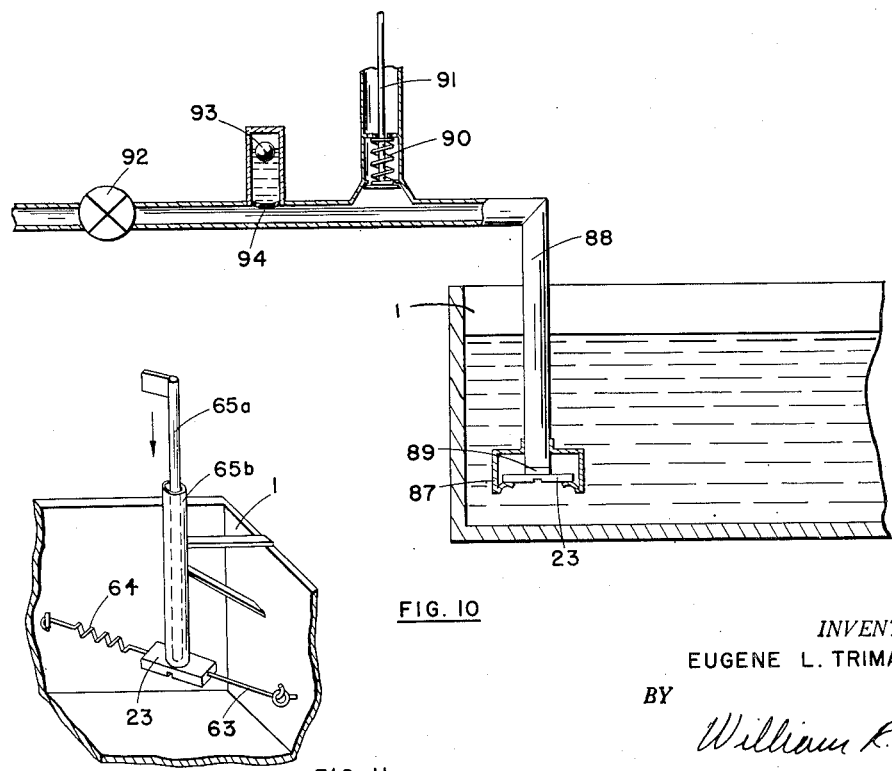
Fig. 10 shows a typical pneumatic means to monitor etching depth.
Fig. 11 shows a modified mechanical monitoring means.

A still further means for monitoring the attainment of the desired depth of etch is illustrated in Fig. 10. An air tube 88, or the like, is provided to be placed in the tank 1. A spring clip, or other clamp-holding device 87 is provided on the end of said tube. A separate fuse link 23 is inserted between the end of the pipe 88 and the fingers of spring clip 87. Preferably, a rubber gasket 89 is placed therebetween. The line 88 is pressurized by a pressurizing means 92. During the etching operation, the line 88 will remain pressurized due to the sealing of the end of air tube 88 by the rubber gasket and the fuse link 23. When a discontinuity occurs in the fuse link 23 due to the etching attack, the air in tube 88 will be able to escape into the tank 1, causing a pressure drop or change in the tube 88. Such pressure change may operate a pressure-operated valve 90 leading to a visual or audio signal-operating line 91, or may move a diaphragm 94 to actuate a visual float signal 93.

The various means described afford an unattended device for accurately determining when a given depth of material has been removed from the workpiece by etching. Compensation for changing bath temperature or for changes in concentration of the etchant and other possible variations and characteristics are unnecessary because of the relative uniformity of attack on the fuse link and the workpiece. Relatively high tolerances are obtained so long as the workpiece is removed from the etching solution promptly after the signal is received.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Means for monitoring the attainment of a desired depth of etch in the etching of a metal workpiece, comprising a metal fuse link adapted to be etched away at the same rate as said workpiece and having a dimension proportional to the desired depth of etch, an electrical sensing means to determine when said etching has caused a substantial electrical discontinuity in said fuse link, and an indicating means responsive to said sensing means to indicate that the desired depth of etch of the workpiece has been attained.

2. In the immersion bath etching of a metal workpiece, means for monitoring a predetermined depth of etch comprising a metal fuse link shunt adapted to be immersed in the bath and subjected to the same etching attack as said workpiece, a source of electric current connected to said fuse link shunt, electrical sensing means responsive to an electrical discontinuity in said fuse link shunt, and signaling means actuatable by an electrical signal from said sensing means to indicate that the predetermined depth of etch has been reached.

3. The invention set out in claim 2 in which the fuse link shunt has a critical minimum dimension proportional to the predetermined depth of etch.

4. The invention set out in claim 2 in which the fuse link shunt is separate from the workpiece.

5. The invention set out in claim 2 in which the fuse link shunt is integral with the workpiece.

6. The invention set out in claim 2 in which the sensing means is a relay responsive to the discontinuity in said fuse link shunt.

7. The invention set out in claim 2 in which the sensing means comprises an induction transformer and the signaling means comprises a glow lamp actuatable upon the attainment of a predetermined ionization level dependent on a change in transformer impedance due to said discontinuity.

8. The invention set out in claim 2 in which a plurality of fuse link shunts and a plurality of sensing means are connected in parallel, a first signaling means is provided to indicate a discontinuity in each of said fuse link shunts and a second signaling means is provided to indicate a discontinuity in any of said plurality of fuse link shunts.

9. The invention set out in claim 2 in which the fuse link shunt is integral with said workpiece and in which an etch proof disc having a diameter twice the predetermined depth of etch and having an electrical connection therethrough is attached to said workpiece whereby the etching attack is adapted to undercut said disc causing said discontinuity.

10. In combination, an etching tank having an etching solution therein, a metal workpiece being etched in the tank and means for monitoring the attainment of a predetermined depth of etch in the workpiece, said means comprising a fuse link of said workpiece metal in said tank simultaneously exposed to the same etching action as said workpiece, sensing means responsive to a discontinuity in said fuse link caused by the etching action, and signaling means actuatable upon receipt of a sense from said sensing means to indicate that the predetermined depth of etch has been reached in said workpiece.

11. The invention set out in claim 10 in which the fuse link has a critical dimension proportional to the predetermined depth of etch.

12. The invention set out in claim 10 in which said sensing means is a mechanical means responsive to a predetermined decrease in the tensile strength of said fuse link.

13. The invention set out in claim 10 in which the sensing means comprises a pneumatic means extending into said tank sealed by said fuse link, and responsive to a pressure change caused by said discontinuity.

References Cited in the file of this patent

UNITED STATES PATENTS

| | | |
|---|---|---|
| 2,168,407 | Holland | Aug. 8, 1939 |
| 2,457,879 | Earle | Jan. 4, 1949 |
| 2,518,909 | Krakauer | Aug. 15, 1950 |
| 2,701,183 | Powers et al. | Feb. 1, 1955 |